Jan. 27, 1970 V. HILDEBRANDT 3,492,656

ZERO REPRODUCTION IN CALCULATORS

Filed March 22, 1967 2 Sheets-Sheet 1

INVENTOR
Volker Hildebrandt

BY Spencer & Kaye
ATTORNEYS

INVENTOR
Volker Hildebrandt
BY Spencer & Kaye
ATTORNEYS

United States Patent Office 3,492,656
Patented Jan. 27, 1970

3,492,656

ZERO REPRODUCTION IN CALCULATORS

Volker Hildebrandt, Constance, Germany, assignor to Telefunken Patentverwertungsgesellschaft m.b.H., Ulm, Danube, Germany Filed Mar. 22, 1967, Ser. No. 625,241
Claims priority, application Germany, Apr. 2, 1966, T 30,833
Int. Cl. G11b *13/00;* G08b *23/00*
U.S. Cl. 340—172.5 12 Claims

ABSTRACT OF THE DISCLOSURE

Two different codes are used for the representation of zero values in a calculator. One code is used to represent zero values which form part of a number in the calculator, and the other code is used to fill the excess register capacity of the calculator, i.e., to fill register positions which do not contain numbers. In one embodiment, which utilizes an excess-3 BCD (Binary Coded Decimal) code, the two codes for zero comprise the tetrads 00LL and 0000, where L represents a binary 1 and the tetrad 00LL represents the zero values which form part of a number, and the tetrad 0000 represents the excess capacity zero values. In the output display of the calculator, the tetrad 00LL is displayed as a zero while the tetrad 0000 is either ignored or displayed as an asterisk. The calculator also contains means for converting the 0000 tetrads into 00LL tetrads for computational purposes.

BACKGROUND OF THE INVENTION

This invention relates generally to electronic calculators and more particularly to electronic calculators in which zero values are visually displayed in two different ways.

The visual display of numbers to be calculated in a calculator, or the results of such calculations, is generally accomplished by printer or indicator means having a visual display field of predetermined digital capacity depending on the maximum possible number of digits in the numbers to be displayed. It is known, in order to improve the legibility of the numerical display, to suppress the "leading zeros" in such a display field in the sense that the digit symbol "0" does not appear there. There are, therefore, two ways of indicating the value of zero, one by the digit symbol "0," and the other by the lack of such a symbol (or by placing an asterisk or the like in its stead) in the "leading zero" positions, i.e., in the display positions which have higher position values than the largest digit position of the displayed number.

It is further known to place the decimal point of different numbers to be calculated always at the same place in the digital registers, for visual display and also during calculation, by filling the partial digital capacity provided for decimal fractions with added zeros, if necessary, which then also appear in the visual display. These added zeros are called "trailing zeros," and they have the undesired disadvantage for a voucher check that the written-in values appear to be more accurate than they really are.

SUMMARY OF THE INVENTION

The principal object of this invention is to overcome the above-noted disadvantage and to provide an improved representation of zero values in calculator circuits and visual display circuits. The present invention eliminates the above-noted disadvantage and improves the legibility of the visual display in a calculator by providing means for representing the "leading zeros" and "trailing zeros"

in a different manner from that used to represent the zeros of numbers entered in the calculator or resulting from calculations therein.

The invention further provides that "numerical zeros," i.e., zeros which form part of a number, are entered into a register which has the digital capacity of the display field and which stores the "numerical zeros" in a different manner from the "capacity-filling zeros." Thus, a special reproduction of the capacity-filling "leading zeros" as well as the capacity-filling "trailing zeros" can be achieved.

Electrical or electronic calculators advantageously operate with digital codes. The present invention provides two differing codes for the value of zero, one code for "numerical zeros" and the other code for "capacity-filling zeros," and converter means for converting the capacity-filling zero code into the numerical zero code during arithmetic operations in the computer.

According to a further aspect of the invention, calculating means can be provided which process both zero codes as a zero value, thereby eliminating the need for a zero code converter.

According to the invention, means are further provided with the value of zero can be introduced into register positions to be erased in the one or in the other code.

In a calculator operating with a tetrad code, it is useful to have one representation of zero formed by the tetrad which generally represents zero in the code employed, and to use a tetrad which does not belong to the code as the other representation of zero. In one embodiment of the invention, which utilizes an excess-3 BCD code, numerical zeros are represented by the tetrad 00LL while capacity-filling zeros are represented by the tetrad 0000.

Although the invention can be applied to a wide variety of different calculators, it will be described herein in connection with serial calculators, particularly of the type utilizing a dynamic storage loop which contains register positions for, e.g., values punched in by means of a ten-key keyboard and also the main register positions required for computations in the four fundamental operations, whereby the calculator can advantageously be utilized as a table-model calculator. The specific embodiments of the invention will be described in combination with this type of calculator, but it should be understood that this invention is by no means limited to any particular type of calculator.

DESCRIPTION OF THE PREFERRED EMBODIMENTS

Figure 1:
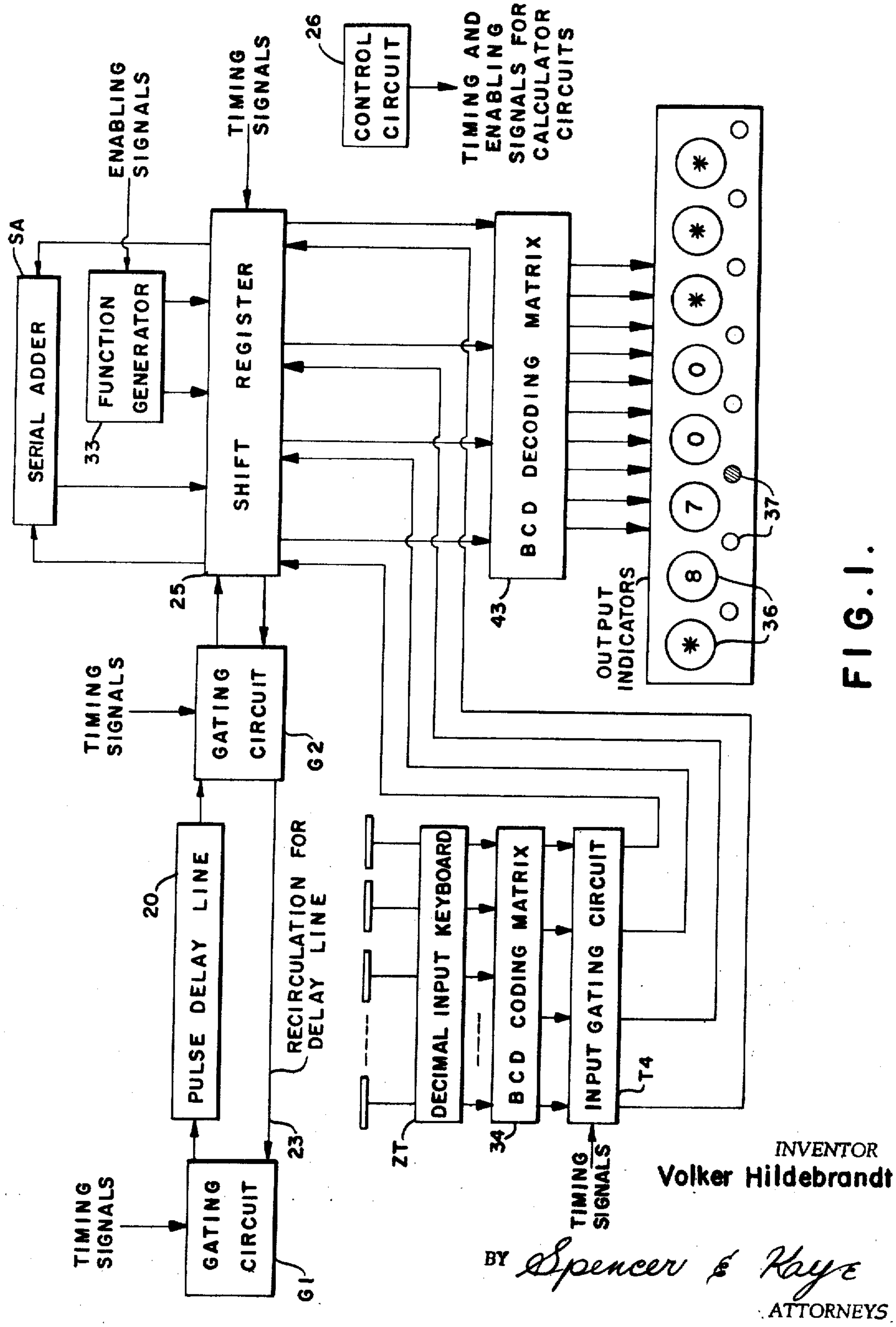
FIGURE 1 is a general block diagram of one illustrative embodiment of the invention in combination with a serial calculator using delay line storage techniques.
Figure 2:
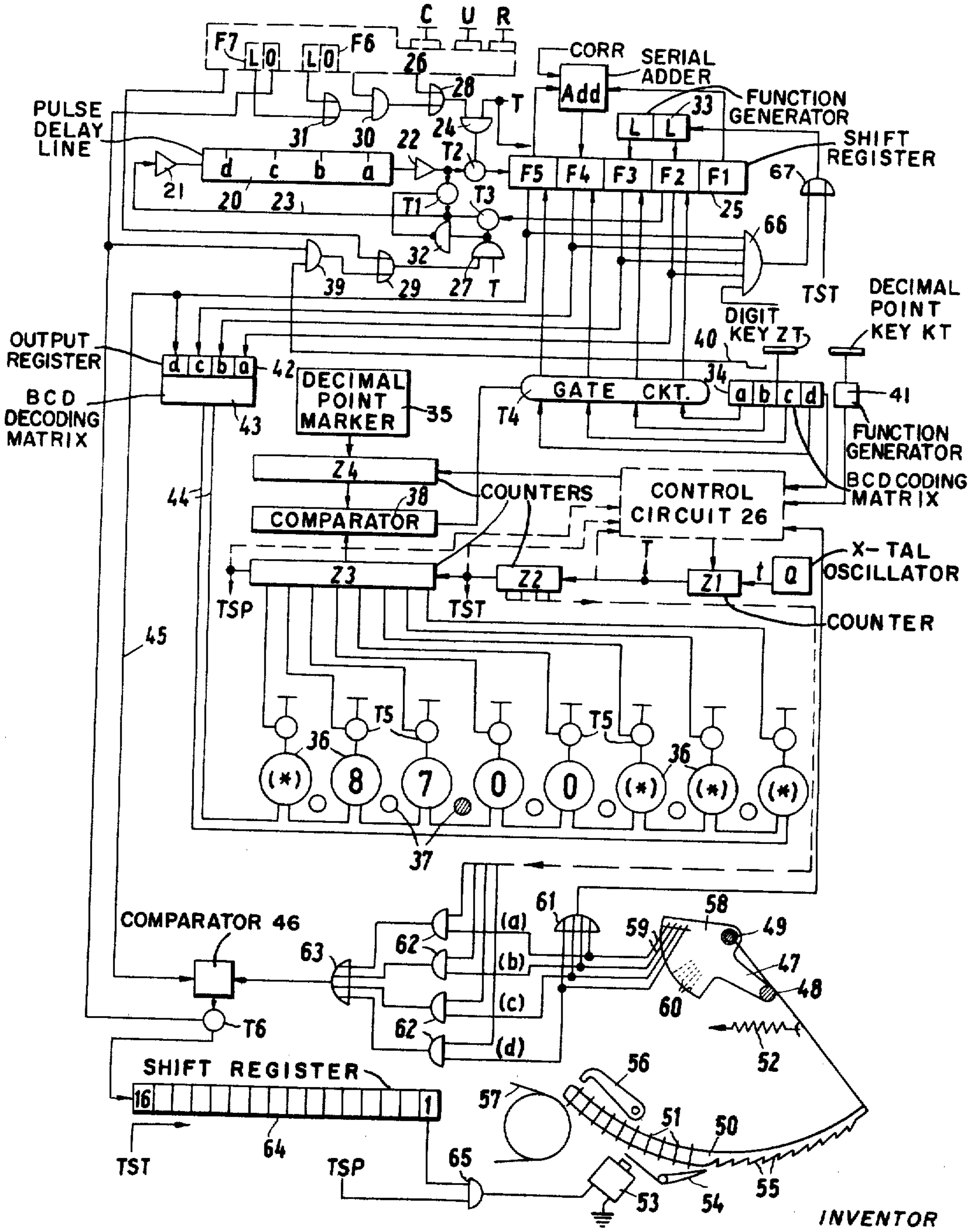
FIGURE 2 is a more detailed block diagram of the embodiment disclosed in FIGURE 1.

FIGURES 1 and 2 show the application of this invention to serial calculators utilizing delay line techniques such as disclosed in my co-pending application Ser. No. 621,047 which was filed on Mar. 6, 1967, for an "Electronic Calculator Utilizing Delay Line Storage and Interspersed Serial Code." This co-pending application is based on German patent application Ser. No. T 30,695, filed on Mar. 17, 1966, the priority of which was claimed in said co-pending application. Before discussing the inventive portion of the circuit in detail, the prior art portions of the circuit will first be reviewed. Referring to FIGURE 1, decimal input digits which are to be entered into the calculator are punched in serially on a decimal input keyboard ZT containing decimal input keys. When any one of the decimal input keys is depressed, a BCD code tetrad corresponding to the selected decimal digit is formed in a BCD coding matrix 34 and applied in paralleled through an input gating circuit T4 to the individual stages of a shift register 25. The tetrad is then shifted in series into a dynamic storage loop including pulse delay line 20, feedback conductor 23, and gating circuits G1 and G2. When the next decimal input key is depressed, the BCD tetrad corresponding to that digit is also entered into the delay line storage loop, and so on until the entire input number is stored therein in BCD form. As described in the above-noted co-pending application, the delay line storage loop has a capacity for storing at least two and preferably four complete decimal numbers. This storage capacity is achieved by timing circuit means which defines time positions in the storage loop representing four different main registers.

The BCD coded numbers which are stored in the delay line storage loop can be serially added by shifting one BCD tetrad out of the loop back into shift register 25, adding this BCD tetrad to another BCD tetrad by means of the serial adder SA which is coupled to the shift register, entering the result of this addition in the shift register, and then transferring the result of the addition back into the delay line storage loop for further storage as described in detail in the above-noted co-pending patent application. Any of the numbers stored in the delay line storage loop can be shifted out of the loop through shift register 25 and applied to an output indicating circuit, which can comprise a visual display device such as indicator lamps 36 and 37 and/or a printing mechanism. It will be appreciated by those skilled in the art that the above described functions require timing signals which, in FIGURE 1, are indicated as being derived from a control circuit 26.

In connection with the above described serial computer circuits, the particular embodiment of the invention illustrated in FIGURE 1 provides that an excess-3 code is used in BCD coding matrix 34 to represent the input digits and that zeros entered by way of the decimal input keyboard are entered as the tetrad 00LL, which is the normal representation for zero in the excess-3 code. The invention further provides that when the registers defined in the delay line storage loop are erased, the zeros resulting from such erasures may be represented by the tetrad 0000 to distinguish the capacity-filling zeros from the numerical zeros entered by way of the decimal input keyboard. When the contents of any of the registers in the delay line storage loop are applied to the output of the calculator for display, a BCD decoding matrix 43 produces a zero indication on output indicator lamps 36 only for the 00LL tetrads and either ignores the 0000 tetrads or reproduces them as asterisks as shown in FIGURE 1. The output display in this embodiment of the invention includes decimal point indicators 37 associated with each of the output indicators 36. The decimal point indicator 37 whch is lit indicates the decimal point position for the displayed number. In the particular example shown in the drawings, the number 87.00 is displayed with one "leading zero" and three "trailing zeros" being indicated by asterisks on the display.

For converting from the capacity-filling zero code to the numerical zero code, a function generator 33 is coupled to shift register 25. When one of the capacity-filling zeros has been shifted into shift register 25, function generator 33 can be triggered by an enabling signal to translate the capacity-filling zero code (0000 tetrads) into the excess-3 numerical zero code (00LL tetrads). The detailed operation of this conversion process, however, involves more detailed aspects of the circuit and will accordingly be described in connection with the more detailed block diagram of FIGURE 2.

FIGURE 2 shows a more detailed block diagram for mechanizing the above described embodiment of the invention in a calculator such as disclosed in the above-noted co-pending application and also including an output printer in addition to the output indicators shown in FIGURE 1. Referring to FIGURE 2, the delay line 20 may for example comprise a glass rod into whose left end shear pulses are introduced by means of a piezoelectric transducer. These pulses are reconverted into electrical pulses by a piezoelectric transducer at the right end of the glass rod. Element 21 is a writing amplifier and 22 is a reading amplifier. The pulses coming from the reading amplifier 22 pass through a gate T1 and through the feedback conductor 23 back to the writing amplifier 21. The pulses circulating in the dynamic storage loop thus formed represent binary bits, the presence of a pulse signifying a binary "0" and the absence of a pulse signifying a binary "L." The numbers to be calculated are expressed as tetrads in binary coded decimal form according to the excess-3 code. The four bits of a tetrad are designated *a, b, c, d*. Four main registers with 16 positions each are formed in the dynamic storage loop by timing circuits as described in the above-noted co-pending application. The delay line 20 therefore has a capacity of 256 bits which move at *t* pulse intervals. The drawing shows a momentary position of a tetrad marked *a, b, c, d* in delay line 20. Its four bits circulate in intervals of ¼ of the delay line, i.e., 64 *t*. For purposes of illustration, it will be presumed that these are the bits of the tetrad which forms the first position in the first register. The bits following at an interval *t* after the above-noted bits form the tetrad of the first position of the second register. The next bits, following again after an interval *t*, form the tetrad of the first position in the third register, and the subsequent group of bits forms the tetrad of the first position in the fourth register. Then follows the tetrad of the second position in the first register, then the one for the second position in the second register, and so on. The above described positioning of the tetrad bits constitutes an interspersed serial code which is described in detail in the above-noted co-pending application. It should be noted, however, that this code is not an essential feature of the present invention, and that the present invention is also applicable to calculators using different codes.

By momentarily opening gate T2 by means of clock pulses T, which enable gate T2 via an AND-gate 24, individual bits can be interrogated from the dynamic storage loop and can be introduced into the first member F5 of a five-stage shift register 25. Every time a bit is introduced, a clock pulse T shifts the previously introduced bits one step to the right in the shift register. Upon storage of a bit *a*, the gate T2 must always be opened at intervals of 64 *t* in order to discharge the subsequent bits *b, c, d*, from the storage loop. If, upon discharge of bit *d*, gate T2 were again opened after 64 *t*, bit *a* of the previously discharged tetrad would appear again. By varying the time interval after discharge of a bit *d*, it is, however, possible to transfer to an adjacent position in the same register or to a different register. This is accomplished by the control mechanism 26 of the calculator at *t* pulse intervals by means of a counter Z1 controlled by a quartz pulse oscillator Q. The counting period of this counter Z1, after which it generates one clock pulse T for each counter cycle, can be adjusted by the control mechanism for any counting period between the values 60 *t* and 68 *t*. After passage of bits *a, b, c*, the counter Z1 each time counts off intervals of 64 *t*. If, after reading of a bit *d*, it counts off an interval of 65 *t*, one moves into the same position of the next register. With an interval of 66 *t*, however, one would move to the same position of the register after the next one. With an interval of 68 *t*, one moves to the next higher position of the register presently employed, and with an interval of 60 *t* one moves to the next lower position of this same register. The selection of registers or the shifting of positions within the registers is accomplished by applying the read-out pulses T, by means of the control mechanism 26, to the position of individual *t* pulses selected from the *t* timing pattern.

The counter Z1 applies its output pulses T to a further counter Z2 as upward-counting pulses. Counter Z2 counts to four in cycles and thus counts off the tetrads. In its highest position "4," it generates one clock pulse TST which is applied to the control mechanism 26 and to other circuits as noted in FIGURE 2. Each pulse TST also acts as upward-counting pulse input to a third counter Z3 which counts to 16 in cycles. Counter Z3 counts through the 16 positions of the register and, upon completion of counting of all 16 positions, it generates a clock pulse TSP which indicates that all 16 positions of the register have been traversed.

The fourth stage F2 of the shift register 25 is coupled to the input amplifier 21 via a gate T3 which is controlled by clock pulses T and an AND-gate 27, so that tetrads contained in the stages F5 to F2 can be shifted, by means of clock pulses T, via F2 and can thus be written into the storage delay line 20.

In order to perform calculations in the four fundamental operations, a serial adder Add is provided. One input of the adder is coupled to F1 and the other input to F5, the output being coupled to F4. To add two numbers the tetrad of the first number is moved from F1 to F4. Simultaneously with the appearance of bit *a* of the first tetrad of the first number in F1, bit *a* of the first tetrad of the second number is shifted from the corresponding position of another register in the delay line storage loop into F5, and both bits are computed in the adder. During addition of the tetrads, the shift connection between stages F4 and F5 is interrupted so that bit *a* of the second summand is not moved along the shift register. Instead, with the next clock pulse, the sum bit *a* formed under consideration of necessary decimal carries moves from Add to F4, while simultaneously bit *b* of the first summand moves to F1, and bit *b* of the second summand is introduced into F5, and both bits are subsequently computed in the adder, and so on. This way, the sum bits are shifted into stages F1 to F4. When the first sum bit is moved to F1, the control mechanism 26 blocks AND-gate 24, via OR-gate 28, and thus closes gate T2 so that during one cycle no bits will move to F5. Instead of F5, a correction input CORR is activated, which effects correction of the sum bits as required each time with the excess-3 code. During shifting of the *b*-bits to F1, the final sum bit *a* is again moved to F4, and so on. Furthermore, when sum bit *a* has reached F2, the control mechanism 26, via OR-gate 29, releases AND-gate 27 and thus gate T3, so that the final sum bits *a*, *b*, *c*, *d*, are consecutively discharged from F2 by clock pulses T and are introduced back into the delay line 20 for storage in a sum register.

Subtractions are accomplished by converting the tetrads of the second summand to their complements during transfer from F5.

All values written in and to be read out are brought into one of the registers of the delay line storage loop, and this register will hereinafter be referred to as register R*e*. The other three registers of the delay line storage loop will hereinafter be referred to under the collective designation of R*r*.

The calculator is provided with erasing keys for the individual registers which keys are all symbolized by key C in FIGURE 2. Transfer keys U are further provided by means of which the contents of a selected register R*r* can be transferred to R*e*, either as sub-total without erasure in the transferring register R*r* or as a final total with erasure in the transferring register R*r*. The calculating keys which actuate the individual arithmetic functions are symbolized in FIGURE 2 by key R. These arithmetic functions might consist of repeated additions or subtractions whose operating sequence has been described above. A ten-key keyboard ZT is further provided to punch in the numbers, as well as a decimal point key KT.

All these keys generate signals which are applied to the control mechanism 26 with the effect that the control mechanism 26 performs according to a fixed program which is required to achieve the successive operations in the calculator. Since such control or program mechanisms are generally known in electronic calculators, the construction of the control mechanism 26 will not be discussed in detail.

The following, however, is to be mentioned in advance of any further description: At the end of each operation initiated by a key C or U or R, the control mechanism 26 adjusts all clock pulses T with "shifting," i.e., all 16 positions are consecutively interrogated, to "register R*e*" and further gives an enabling potential to an AND-gate 30. Thus, the AND-gate 24 can be activated by an OR-gate 31, and it will then open gate T2 by means of clock pulse T. The AND-gate 24 can further be closed or opened directly by the control mechanism 26, via the OR-gate 28, as is the case in the addition processes described above. AND-gate 24 is usually open and is closed only in those special cases where gate T2 must be closed. AND-gate 27, however, and thus gate T3, are usually closed. Gate T1 is then opened via a negation member 32. Only during storing or exchange processes is the gate T3 enabled by clock pulses T via AND-gate 27, whereby gate T1 is closed, via negation member 32, every time T3 is opened. Therefore, except for the periods where bits are recirculated via gate T3, the bits in the delay line 20 move through gate T1 and the feedback line 23, while simultaneously the bits of the positions of register R*e* reach the shift chain 25 via gate T2 in cyclic repetition.

If a register is to be erased in its entirety, the erasing key C associated to this register must be punched, which produces the following result: the AND-gate 24 is kept closed by the control mechanism 26 via AND-gate 30 as well as OR-gate 28, and thus gate T2 is also closed. However, an enabling potential is given to AND-gate 27, via OR-gate 29, so that the clock pulses T can open gate T3. The clock pulses T are timed in the control mechanism 26 so that they consecutively fall on the bit times of the tetrads in the 16 positions of the selected register. While now, because of the closing of gate T2, only "0" values gain entry into the shift register 25, the control mechanism 26, on the other hand, switches the position timing pulses TST via an OR-gate 67 to a function generator 33, which thus sets stages F3 and F2 of the shift register 25 for the logical value "L" with each pulse TST. The binary contents of stages F5 to F2 are consecutively recirculated from F2 via gate T3 into delay line 20. The tetrads resulting from this first type of erasing process are in the form of "00LL." The erasing process is terminated by clock pulse TSP after one passage through counter Z3.

To enter values into register R*e* by means of the ten-key keyboard, the corresponding digit keys ZT are consecutively punched in. Each digit key actuates a contact which causes a code matrix of known type, in the drawing symbolized as 34, to generate the appropriate values for the tetrad bits *a*, *b*, *c*, *d* associated with the punched key, and these bits are fed in parallel via a gating circuit T4 into stages F5 and F2 of the shift chain. The code matrix 34 is an excess-3 coding matrix in which the numeral zero is expressed as the tetrad "00LL."

A decimal point marker 35, e.g., a pusher or a rotary knob, is provided with which the position can be marked at which the decimal point is to appear. Between indicator elements 36 of an indicator register small lamps 37, e.g., can be provided, which show the decimal point position in the register by lighting up, as indicated in the drawing by the shaded lamp 37. In addition to the appropriate lamp 37, the setting of decimal point marker 35 also sets a mark counter Z4 which then contains a binary notation of the number of the register position in front of which the decimal point is to be placed. A comparator 38 is provided which compares the state of counter Z4 with the state of counter Z3 and generates an output signal when the state of the two counters coincides. As mentioned earlier, the counter Z3 counts through the register position 1 through 16 in a cycle, i.e., it contains the sequence of the position numbers in binary notation. When the contents of counters Z4 and Z3 coincide, the comparator 38 generates an enabling signal for gate T4. The exact time of opening of the gate is determined by the subsequent clock pulse T.

A flip-flop F6 is provided in the control mechanism 26 which in its basic position has the value position shown in the drawing, which however is moved to another position by depressing one of the keys C, U or R so that it gives a "0" potential to OR-gate 31. Upon depressing a digit key ZT, a further flip-flop F7 in the control mechanism is moved to a value position other than the one depicted for the period which corresponds to the time it takes to run through the 16 positions of register R*e*. Flip-flops F6 and F7 form a part of control circuit 26, for the sake of convenience this part of the control circuit 26 is shown in FIGURE 2 near the gates whose operation it controls.

After depressing a first digit key, therefore, both flip-flops F6 and F7 are set, both inputs of OR-gate receive an "0" potential, and AND-gate 24 can not be activated via AND-gate 30, i.e., gate T2 remains closed. As mentioned already, clock pulses T are set for register R*e* with upward shifting. AND-gate 27 remains activated via OR-gate 29 and is enabled via an AND-gate 39, which receives its enabling potential from flip-flop F7 during the predetermined period and which is further actuated by depressing a digit key ZT via a line 40. The clock pulses therefore write the binary positions of stage F2 into the delay line 20. Since the shift chain 25 does not receive any values at its input because of the closed gate T2, tetrads "0000" are entered via F2 and gate T3—as an erasing process of the second type—into the positions of register R*e*, with the exception, however, of the position on the left of the decimal point. This is where the punched value arrives which, in the manner already described, is entered in parallel into stages F5 through F2 at the moment predetermined by the comparator 38 ("one position to the right of the decimal point") and which then, because of the upward shift, is stored in the delay line 20 in the mentioned position to the left of the decimal point of register R*e*. Flip-flop F7 is reset by the clock pulse TSP, and resets flip-flop F6 which thus applies an "L" potential to OR-gate 31, so that the blocking of AND-gate 30 as well as AND-gate 24 and gate T2 is removed for the period during which further punching of the digit keys ZT can take place.

The second depressing of a digit key has the effect that gate T3 is actuated as mentioned before, whereby now, however, all tetrads of register R*e* contained in delay line 20 move via gate T2 and stages F5 through F2, whereby they are re-entered into register R*e* via gate T3 with a shift into the next higher position. The punched value is further stored in the position to the left of the decimal point in the manner described. This is repeated with the depression of every digit key, whereby the earlier punched numbers move one position further to the left each time.

As soon as the decimal point key KT is depressed, a function generator 41 connected therewith gives a signal to the control mechanism 26 which causes the storage process to occur in a somewhat different manner. With each depressing of a digit key ZT, the control mechanism 26 gives a downward-counting pulse to the mark counter Z4, which counts counter Z4 back by "1." The upward shift in register R*e* is now always switched off after the position following the marked position so that the digits stored in higher positions are now no longer shifted. This means that the first digit punched in after the decimal point key has been punched is stored in the position to the right of the decimal point in register R*e* and that subsequently punched digits line up in succession towards the lower positions of register R*e*. If register positions below the last punched digit are still free in register R*e*, these will still contain, as before, the tetrads "0000" which were created by the erasing process initiated by punching the first digit key. It should be noted that the lowest position of register R*e*, as long as no digit was punched into it, will always contain the tetrad "0000" because no lower position is available from which, during upward shifting, another value could be transferred into the lowest position.

After punching in a number, therefore, whose digits do not completely fill the register, the values for zero are represented in two different ways in register R*e*, depending on whether they are zeros resulting from an erasing process ("0000") or punched-in zeros ("00LL"). "0000" tetrads appear only in all those positions of R*e* which are higher than the highest punched-in position and lower than the lowest punched-in position.

Stages F5 through F2 of shift register 25 are continuously coupled to the stages of a four-stage register 42 whose position flip-flops are set by pulses TST in the same manner as stages F5 to F2. Coupled to register 42 is a decoding matrix 43 which can decode tetrads contained in register 42 in a known manner and which activates an associated digit line for each tetrad. In the present case, 11 such digit lines 44 are provided, ten digit lines for number values and one for the tetrad 0000. The indicator elements 36 of the earlier-mentioned output register, of whose 16 positions only 8 positions are shown in the drawing, might consist of glow discharge tubes of a known type with glow electrodes which can be individually controlled via digit lines 44 and which have the form of the digit symbol to be indicated in each case. The digit line activated by the "00LL" tetrad is to be connected to that electrode of tubes 36 which displays the usual digit symbol "0." The other digit electrodes of the tubes are also connected in parallel to the associated digit lines. The eleventh digit line, which is activated by "0000" tetrads, can be connected to those electrodes of tubes 36 which display, e.g., an asterisk, as shown in parentheses in the drawing. Decoding of the "0000" tetrad can also be completely dropped and the eleventh digit line can be eliminated if desired. In such a case, a "0000" tetrad does not produce any kind of display. Each digit tube 36 begins to glow when an operating voltage is applied thereto via an associated gate T5. As already mentioned, the counter Z3 counts through the 16 register positions and thereby gives consecutive enabling pulses to the gates T5 of the individual positions of the output register in the timing of pulses TST of the passage through the positions. With every clock pulse TST only the tetrad of the associated position reaches register 42 where it will remain until the next position time pulse. These are always tetrads of register R*e* whose positions consecutively move, in cyclic repetition, into stages F5 to F2 of shift chain 25, unless a momentary operation occurs caused by depressing key C, U or R. The cyclic passage occurs so quickly, because of the high pulse frequency of the delay line, that a standing picture of the digits results in the tubes 36 of the output register. Because of this permanent display, punched-in numbers are also immediately displayed since they always reach register R*e*. The usual digit symbols hereby appear only in those positions for which digits were punched in, while capacity-filling zeros above the highest punched position as well as below the lowest punched position are shown in the manner that either no symbol or perhaps the above mentioned asterisk or the like appears. Thus the punched-in numbers can be read more clearly. The punched-in numbers are always oriented to the decimal point which was set in by decimal point marker 35 and which is indicated by a small lamp 37.

Instead of glow discharge tubes, the screen of a digit-writing cathode ray tube, known per se, can be used for the display of the numbers, whereby the digits are always written into the correct digital positions. In this case, digit lines 44 are used to select the "symbol generators" which bring forth the desired symbol each time. It is also known to simultaneously display on such a screen the contents of several registers in successive lines one below the other. In this case, legibility is also improved if the numbers of a register into which the newly punched values are being stored are displayed with different type zeros in accordance with the present invention.

In the calculator of the present embodiment, as already mentioned, all values to be displayed are transferred for this purpose from a register R*r* into the register R*e* by means of a key U, whereby an automatic display then occurs in the indicator elements 36.

As mentioned in the introduction, the identification of zeros actually written in is particularly useful with a permanent visual record of numbers written into the calculator. A suitable printing mechanism is shown schematically in FIGURE 2 for permanently recording the numbers in this embodiment of the invention. The printing mechanism includes comparator 46 coupled via a line 45 to stage F5 of shift register 25, the latter consecutively receiving the tetrad bits of the individual positions of register R*e*, so that all these bits are serially introduced into comparator 46. A mechanical printing mechanism, shown only schematically in the drawing, contains, in a generally known manner, a rocker 47 with a cross bar 48 which, for each printing process, moves once in clockwise direction around an axis 49 and then back into the basic position shown in FIGURE 2. Each one of the printing mechanism positions (in this Example 16) contains a type carrier, here constructed as a segment 50 pivotable around axis 49 and provided with printing type faces 51. When the cross bar 48 swings to the left, all type segments 50 follow due to the action of a tension spring 52 attached to each type segments. Each printing segment 50, however, can be arrested in any selected type position by exciting an electromagnet 53 which then inserts a latch 54 into a ratchet 55 of the type segment. Thus, in each position, the presently selected type face 51 is disposed in front of a printing hammer 56, and by simultaneous release of all printing hammers 56, the entire number (16 digits in this example) can be printed in one line on the paper 57.

A printing type position generator is connected to the rocker 47, 48, which in the drawing is also shown only schematically as a sector-shaped body 58. Four scanners 59 scan four circular tracks on the surface of sector body 58 when it swings in clockwise direction. The scanners 59 can be cam levers or electrical brushes or photoelectric scanners. The sector-shaped body 58, which comprises a function generator, contains cams or contacts in the four tracks or photoelectrically scannable markings, which form radial lines 60, so that with each type position of the type segments 50, which move synchronously with the rocker 47, 48, the tetrad code associated to each type position is scanned by the scanners 59, during the period in which one tooth of ratchet 55 moves under the latch 54. Therefore, one line 60 on the function generator 58 is associated with each printing type position which line is scanned by the scanners 59. The lines are separated by a small space between them. The associated printing type positions "9" to "0" are represented on the lines in excess-3 code. Since each tetrad hereby contains "L" values, each time a line moves under the scanners 59, an L-signal is given via an OR-gate 61 and is introduced into the control mechanism 26. The bit values *a*, *b*, *c*, *d*, of the code scanned by the function generator 58 are further transferred to each one of the AND-gate 62.

Actuated by a pulse from OR-gate 61, the control mechanism 26 initiates the following processes after the first line of the function generator 58 has moved under the scanners 59 (type and code "9"): A gate T6 at the output of comparator 46 is opened for a period determined by flip-flop F7, during which all the positions of register R*e* enter the shift register 25 once, i.e., the tetrad bits *a*, *b* ,*c*, *d*, of all positions in R*e* appear consecutively with clock pulses T at the input stage F5 and thus in the comparator 46. The counter Z2, which, as explained earlier, always counts to four and thus counts off the tetrad bits, marks the individual bit times and activates one of the AND-gates 62 for each tetrad bit time so that simultaneously with the bits *a*, *b*, *c*, *d* coming from stage F5, the bits of the tetrad taken off by function generator 58 consecutively reach the comparator 46 via an OR-gate 63. When the comparator 46 determines that a bit coming from F5 does not coincide with the bit coming from OR-gate 63, it generates a pulse, via gate T6 for the input stage 16 of a 16-stage shift register 64, which pulse sets stage 16 at "L." This serial bit comparison with generation of a signal at a point when two bits do not coincide (which means noncoincidence of the compared codes) can be accomplished with a very simple comparator, namely with an AND-gate having two inputs, whereby the bit values are brought to one of the inputs in negated form. The contents of the shift chain 63 are shifted towards the right from stage to stage with clock pulse TST as shift pulse, TST being the timing pulse which is generated after completion of counting of each four tetrad bits. During one passage through the 16 positions of the register R*e*, shift register 64 is filled in such a manner that when a position code from R*e* does not coincide with the position code predetermined by function generator 58, an "L" is introduced into the shift register 64. When coincidence occurs, a "0" is introduced into shift register 64. Each stage of shift register 64 is associated with a position in the printing mechanism. The illustrated printing segment 50 represents the lowest position 1 in the printing mechanism. In this case, the latching magnet 53 of this position is coupled, as shown, to stage 1 of shift register 64. Accordingly, the further stages 2 to 16 of shift register 64 are coupled to latching magnets 53 of the corresponding printing mechanism positions 2 to 16. Since the position tetrads of register R*e* are read out beginning with the lowest position and are brought to the comparator 46, the comparison signals of the individual positions are distributed in the stages of shift register 64 in their correct positions upon completion of passage through all positions. Clock pulse TSP appearing after discharge of all 16 positions then activates an AND-gate 65 in each printing mechanism position with the effect that the associated latching magnet 53 responds in all those printing mechanism positions whose associated stage in shift register 64 has the value "0." Thus latch 54 is thrown into ratchet 55 and the printing segment 50 is arrested with the appropriate type face 51 positioned under hammer 56. According to the first step of the above described method, therefore, when the first type is the "9," for example, all printing segments 50 of those positions are stopped in which the register R*e* contains the value "9." Upon continuation of movement of rocker 47, 48, the next tooth of ratchet 55 moves under latch 54 corresponding with the next type face, e.g., "8," and at the same time the next line 60 of function generator 58 moves under the scanners 59 whereby it again generates an exciting signal, via OR-gate 61, to the control mechanism 26 and further readies the code for the "8" at AND-gates 62. The above described process is then repeated, whereby now all printing segments 50 are arrested in those positions in which register R*e* also contains the value "8" and so on.

For the printing type face "0," the printing function generator 58 contains the tetrad 00LL. The symbol "0" is therefore set for printing in all those positions in which register R*e* also contains the tetrad 00LL. During passage of types "9" to "0," such positions for which tetrad 0000 is contained in register R*e* do not receive any arresting signals. The printing segments 50 for these positions follow rocker 47, 48 for one more partial step to its end position in which the printing hammer 56 either contains no type or, e.g., a type containing the asterisk symbol.

At the end of the forward swing of rocker 47, 48, all printing hammers 56 are simultaneously released whereby the entire 16-digit number is printed. The rocker 47, 48 then returns into the illustrated basic position collecting all type segments. The printed number then shows the symbol "0" in all those positions in which the register R*e* contained the tetrad 00LL, whereas the zero value is represented by the lack of a symbol or by an asterisk in all the capacity-filling zero positions in which register R*e* contained tetrads 0000.

If the contents of a register R*r* are to be printed, then, as already explained, the contents of these registers are first transferred to register R*e* and then printed in the above described manner.

The numbers written into register R*e* are also to be utilized as arithemtic values, i.e., are to be combined with numbers already contained in registers R*r* by means of addition and subtraction, whereby accumulated additions occur for multiplication and accumulated subtractions occur for division. It is provided that for the purpose of these arithmetic processes 0000 tetrads contained in register R*e* are converted into 00LL tetrads of the excess-3 code for which the logic calculating mechanism is programmed.

It has been explained earlier that in addition, the tetrads of the first summand are entered into stages F4 to F1 of shift chain 25, while tetrad bits of the second summand (which are complemented for subtractions) reach only the input stage F5. The control mechanism 26 includes means for insuring that numbers from register R*e* are always considered as first summand. This is accomplished as follows: stages F5 to F2 of shift register 25 are coupled to four inputs of an AND-gate 66. AND-gate 66 receives from the control mechanism 26 a clock pulse TST applied to the fifth input, when a tetrad is contained in stages F5 to F2, and it releases clock pulse TST when all stages F5 to F2 are in the state of "0." The clock pulse TST then reaches, via OR-gate 67, the function generator 33, which thus, as mentioned earlier, sets stages F3 and F2 of shift chain 25 for the logical value "L." Instead of tetrad 0000, the tetrad 00LL is therefore moved into stages F4 to F1 with the next clock pulse T from where it is computed in the adder Add in the manner described earlier. The tetrads coming from one register R*r* to the input stage F5 as tetrads of the second summand always have the form 00LL for the zero value, as is evident from the preceding description of the erasing process for these registers, and also because the calculations are always accomplished in the excess-3 code.

Instead of the method previously described, namely to always convert the 0000 tetrads into 00LL tetrads for computation in the calculating mechanism, it is also possible to construct the logic calculating mechanism in such a manner that it can compute the zero tetrads 00LL of the excess-3 code as well as the capacity-filling tetrads 0000 as "zero" calculating values. In certain cases, however, a bit conversion as described below is required, which, however, can be easily accomplished in shift register 25. In the excess-3 code, all numerical values are coded three binary values too high as compared to a pure binary code, and the result from an addition of two numbers is therefore too high by 6 binary values and, as is known, a correction has to be made. The binary carry is not entered three binary values too high and therefore requires no further correction.

If one of the two numbers or both numbers together have the value of a binary zero 0000, no correction is necesary, because the number remains coded three binary values too high, or remains as a binary zero, respectively. This is true when no decimal carry is present from the next lower position. If such a carry is present, however, a correct result is achieved when this carry is not considered but a 0000 tetrad of the first or of the second summand is converted into "0L00" instead whereby, if both tetrads to be summed are 0000, only one tetrad need be converted to 0L00.

It will be understood that the above description of the present invention is susceptible to various modifications, changes, and adaptations, and the same are intended to be comprehended within the meaning and range of equivalents of the appended claims.

I claim:

1. In a calculator having means for receiving input numbers, including the number zero, and having a visual display mechanism in which two different indications for the number zero may be formed in a visual display field, the improvement comprising means for forming one zero indication in said visual display field for zero values which are entered into the input of said calculator and for forming the other zero indication in said visual display field for zero values which have lower numerical position values than the numbers which are entered into the input of said calculators, said calculator including a storage register having a position capacity equal to that of said visual display field, and means for erasing the contents of said storage register and entering zero values in all of the positions thereof, and wherein zero values which are entered into the input of said calculator are represented in said storage register in a different manner from the zero values created therein by said erasing means.

2. The improvement defined in claim 1 wherein one digital code is used in said storage register for zero values entered therein by said erasing means and a different digital code is used in said storage register for zero values entered therein from the input of said calculator, and further comprising means coupled to said storage register for converting said zero values from said one digital code to said different digital code for performing arithmetical operations on the contents of said storage register.

3. The improvement defined in claim 1 wherein one digital code is used in said storage register for zero values entered therein by said erasing means and a different digital code is used in said storage register for zero values entered therein from the input of said calculator, and further comprising means coupled to said storage register for performing arithmetical operations on the contents of said storage register, the last mentioned means being capable of recognizing zero values expressed in either of said two digital codes.

4. The improvement defined in claim 2 and further comprising means for entering zero values into said storage register in one code or the other into register positions to be erased.

5. The improvement defined in claim 2 and further comprising a shift register coupled to said storage register for entering numbers therein and extracting numbers therefrom, arithmetic circuit means coupled to said shift register for performing arithmetical operations on said numbers, interrogation means coupled to said shift register for detecting the presence of zero values expressed in said one digital code, and function generator means coupled between said interrogation means and said shift register for converting said zero values from said one digital code to said different digital code before said zero values are transferred to said arithmetic circuit.

6. The improvement defined in claim 5 wherein the input to said calculator comprises a ten digit keyboard and means for translating each digit of said keyboard into corresponding code bits which are applied to said shift register, said storage register being one register of a multi-register dynamic storage loop for receiving and storing code bits shifted thereinto from said shift register, and means coupled to said shift register for entering capacity-filling zero values into said dynamic storage loop in said one digital code.

7. The improvement defined in claim 6 and further comprising means coupled to said keyboard and to said shift register and responsive to the first input digit generated by said keyboard to enter said first input digit into one position of a register in said dynamic storage loop and simultaneously to enter zeroes expressed in said one digital code in the other positions of said register, and means for entering digits subsequently generated by said keyboard into corresponding positions of said register in place of said zeros entered therein, the zero digits generated by said keyboard being expressed in said other digital code.

8. The improvement defined in claim 5 and also including means coupled to said shift register for replacing the entire contents of a register in said dynamic storage loop with zero values expressed in said other digital code.

9. The improvement defined in claim 5 wherein said shift register has five stages, the first stage of said shift register being coupled to an input of said arithmetic circuit, the second stage being coupled to the output of said arithmetic circuit, the third and fourth stages being coupled to a function generator, and the fourth stage being further coupled to the input of said storage register, a coincidence circuit coupled to the second, third, fourth, and fifth stages of said shift register for detecting the presence of a 0000 tetrad therein, and means coupled between the output of said coincidence circuit and said function generator, to activate said function generator at predetermined times to change the 0000 tetrad in said shift register to a 00LL tetrad.

10. The improvement defined in claim 6 and further comprising an output decoding circuit coupled to said shift register and an output indicator coupled to said output decoding circuit, said output indicator including means for representing zero output numbers in two different ways, and said output decoding circuit including means for distinguishing zero output numbers expressed in said one code from zero output numbers expressed in said different code and for actuating said output indicator to represent the zero output numbers in one way or the other in accordance with the code thereof.

11. The improvement defined in claim 6 and further comprising a printing mechanism coupled to said shift register, said printing mechanism including a plurality of movable digit type carriers each containing two different representations for zero values, a position code generator moving in accordance with said digit type carriers, said position code generator including means for generating codes corresponding to individual digit positions of the digit type carriers, a comparator coupled between said shift register and said position code generator for comparing the code of digits in said shift register to the codes generated by said position code generator, and means coupled to the output of said comparator for arresting the motion of said movable digit type carriers when the code generated by the position code generator coincides with the code of the digit in said shift register to print out the digit represented by said code.

12. The improvement defined in claim 5 wherein said storage register comprises one register of a multi-register dynamic storage loop for receiving numbers being entered by the keyboard and all numbers to be displayed, and further comprising timing means coupled to said dynamic storage loop for defining the bit times therein and for shifting the bits stored therein into said shift register.

References Cited

UNITED STATES PATENTS

| | | | |
|---|---|---|---|
| 2,848,708 | 8/1958 | Burkhart et al. | 340—173 |
| 3,107,342 | 10/1963 | Estrems et al. | 340—172.5 |
| 3,121,860 | 2/1964 | Shaw | 340—172.5 |
| 3,286,237 | 11/1966 | Kikuchi | 340—172.5 |
| 3,375,498 | 3/1968 | Scuitto et al. | 340—172.5 |

RAULFE B. ZACHE, Primary Examiner

U.S. Cl. X.R.

340—324